United States Patent Office 3,454,652
Patented July 8, 1969

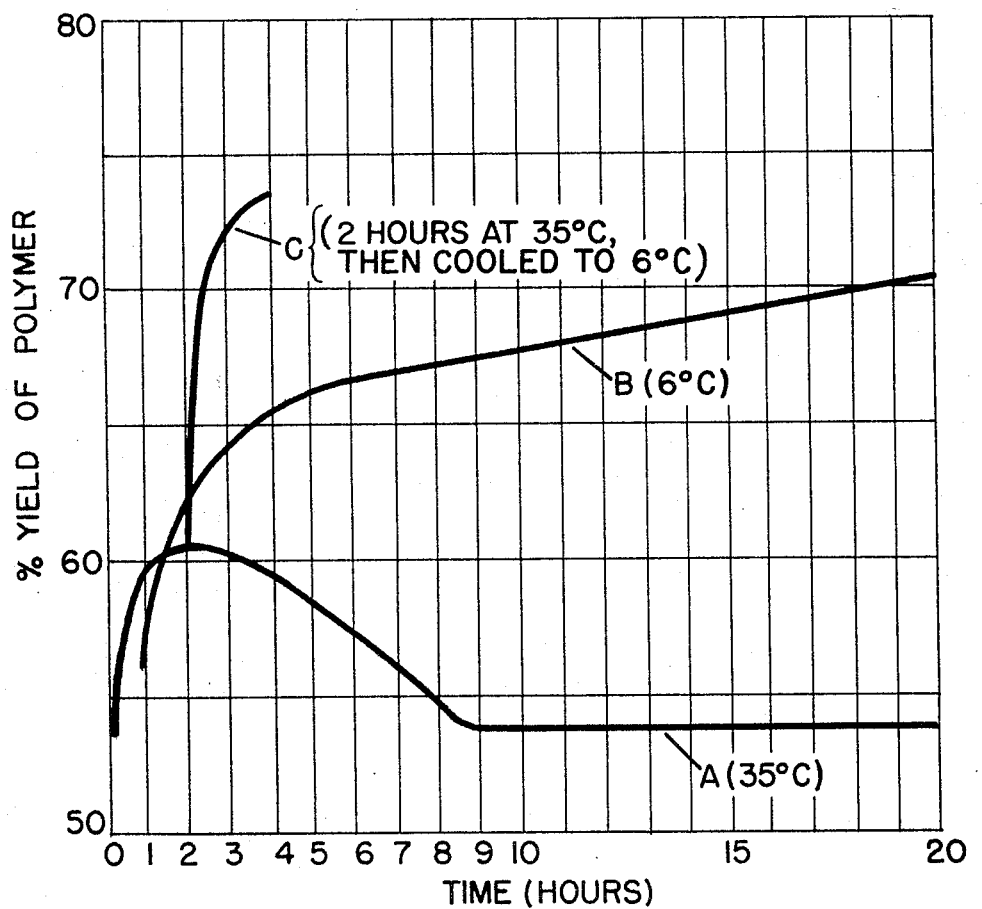

3,454,652
PROCESS FOR PRODUCTION OF TETRAHYDRO-
FURAN POLYMERS
Andrew P. Dunlop, Riverside, and Edward Sherman,
Chicago, Ill., assignors to The Quaker Oats Company, Chicago, Ill., a corporation of New Jersey
Continuation-in-part of application Ser. No. 323,192,
Nov. 6, 1963. This application Sept. 22, 1966, Ser.
No. 584,319
Int. Cl. C07c 43/00; C07d 5/02
U.S. Cl. 260—615                    8 Claims

ABSTRACT OF THE DISCLOSURE

In the polymerization of tetrahydrofuran by contacting the tetrahydrofuran with a polymerization catalyst higher yields are achieved in shorter times by the method in which
(a) contacting occurs at a higher temperature
(b) the resulting reaction mass is cooled to a lower temperature prior to termination of catalytic activity, and
(c) the cooled reaction mass is maintained at the lower temperature during the termination of the catalytic activity.

RELATED APPLICATIONS

This application is a continuation-in-part of our previous application Ser. No. 323,192, filed Nov. 6, 1963, now abandoned.

This invention relates to processes for producing polymers of tetrahydrofuran, and more particularly to an improvement thereof whereby tetrahydrofuran polymers are produced in significantly improved yield.

Pure tetrahydrofuran is polymerized in a substantially anhydrous system in the presence of one or more of the many catalysts well known in the art. As used herein, the abbreviation THF refers to tetrahydrofuran.

An object of this invention is to provide a process for production of tetrahydrofuran polymers in significantly higher yields and significantly shorter time than those achieved by otherwise equivalent prior art processes.

A further object of this invention is to provide a process for production of tetrahydrofuran polymers which provides efficient utilization of catalyst as evidenced by the number of moles of polymer formed per mole of catalyst.

Another object of this invention is to provide a process for production of tetrahydrofuran polymers by which tetrahydrofuran is polymerized with high catalyst efficiency at temperatures below 32° C. and even below 20° C.

A further object of this invention is to provide a novel process for production of polytetramethylene ether glycol which provides very high yields in comparatively short times with high catalyst efficiency.

Another object of this invention is to provide a process which gives improved yields of tetrahydrofuran polymers without the necessity of crystallizing the active polymers out of the reaction mixture.

These and other objects which are apparent herein are accomplished in accordance with this invention by a THF polymerization process comprising the steps:

(1) Contacting tetrahydrofuran and a tetrahydrofuran polymerization catalyst at an average contacting temperature between 20° and 80° C. thereby forming a catalytically active mixture;
(2) Cooling the mixture to below the cooling threshold temperautre, said cooling threshold temperature being defined as 5° C. below maximum contacting temperature when the maximum is up to 37° C., and said threshold temperature is defined as 32° C. when the maximum contacting temperature is above 37° C.;
(3) Maintaining the mixture resulting from step 2 at a temperature below the threshold temperature for a period of time up to 4 hours;
(4) Admixing the mixture resulting from step 3 with a catalytic activity terminating agent in more than a stoichiometric amount based on its reaction with the catalyst; and
(5) Maintaining the temperature of the mixture resulting from step 4 below the threshold temperature until that catalytic activity is terminated, the time interval from the contacting of step 1, to the reaching of the threshold temperature in step 2, being up to 240 minutes when the average contacting temperature is up to 50° C., and for an average contacting temperature between 50° C. and 80° C. is a time up to the time corresponding to that temperature on a smooth plot of temperature v. time which goes through the points:

| Degrees C.: | Minutes |
|---|---|
| 50 | 240 |
| 55 | 200 |
| 60 | 150 |
| 65 | 90 |
| 70 | 45 |
| 75 | 10 |
| 80 | 1 |

A more specific embodiment of this invention is the process comprising contacting THF and a polymerization catalyst at a temperature above about 20° C., thereby forming a catalytically active THF-catalyst-polymer mixture, cooling the active mixture to a temperature below about 15° C., and mixing the cooled active mixture with a catalytic activity-terminating agent at a temperature below about 15° C. until the catalytic actvity is substantially terminated.

A preferred embodiment of this invention is a process including the steps:

(1) Contacting tetrahydrofuran with a tetrahydrofuran polymerization catalyst selected from the group consisting of fluosulfonic acid, perchloric acid and phosphorus pentafluoride at a contacting temperature in the range 25 to 50° C. for a period of time up to four hours;
(2) Cooling the mixture resulting from step 1 to below the cooling threshold temperature, said cooling threshold temperature being defined at 5° C. below maximum contacting temperature when the maximum is upto 37° C. and said threshold temperature is defined as 32° C. when the maximum contacting temperature is above 37° C.;
(3) Maintaining the mixture resulting from step 2 at a temperature below the threshold temperature for a period of time up to four hours;
(4) Admixing the mixture resulting from step 3 with a catalytic activity terminating agent in more than a stoichiometric amount based on its reaction with the catalyst; and
(5) Maintaining the temperature of the mixture resulting from step 4 below the threshold temperature until that catalytic activity is terminated.

The polymerization catalysts used in this invention are any of the catalysts well known for polymerizing THF. These catalysts include any of the catalysts selected from the following groups:

(1) Strong acids which give anions that are weak nucleophiles such as ($ClSO_3H$), ($FSO_3H$), ($HClO_4$), ($H_2S_2O_7$), ($HIO_3$);
(2) Metal halides such as $SbCl_5$, $SnCl_4:BF_3$;

(3) Nonmetal halides such as $BF_3$, $PF_5$;
(4) Nonmetal halides such as $BF_3$ in the presence of (a) $H_2O$, (b) $FeCl_3$, (c) diazo compounds, e.g., ethyl diazoacetate, diazomethane;
(5) Friedel-Crafts halides (Lewis acids) such as $AlCl_3$, $BF_3$, $FeCl_3$, $SbCl_5$, $SnCl_4$ in the presence of reactive halogen such as:
   (a) Alkyl halides, e.g., $CH_3OCH_2Cl$, $[Cl(CH_2)_4]_2O$,

, $C_2H_5F$, $CH_3CO_2(CH_2)_4Cl$ (b) Acid halides, e.g., $CH_3COCl$, $C_6H_5COCl$, $POCl_3$, $SOCl_2$, $C_6H_5SO_2Cl$;
   (c) Haloacids, e.g., HCl;
   (d) Other metal halides, e.g., $AsCl_3$, $SbCl_3$, $SiCl_4$, $TiCl_4$, $ZnCl_2$, $ZrCl_4$;
   (e) Nonmetal halides, e.g., $BCl_3$, $PBr_3$, $PCl_3$, $PCl_5$, $SCl_2$, $S_2Cl_2$;
   (f) Aryldiazonium chlorides, e.g., $C_6H_5N_2Cl$.
(6) Friedel-Crafts halides (Lewis acids) such as $AlCl_3$, $BF_3$, $FeCl_3$, $SbCl_5$, $SnCl_4$ in the presence of epoxides such as ethylene oxide, propylene oxide, butylene oxides, phenoxypropylene oxide, cyclohexene oxides, epichlorohydrin, butadiene dioxide, trimethylene oxide, bischloromethyl oxetane, 1,4-epoxycyclohexane.
(7) Strong acids such as $HClO_4$, $H_2SO_4$ in the presence of acid anhydrides such as $(CH_3CO)_2O$,

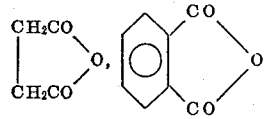

(8) Friedel-Crafts halides (Lewis acids) such as $AlCl_3$, $BF_3$, $FeCl_3$, $SbCl_5$ in the presence of acid anhydrides such as $(CH_3CO)_2O$,

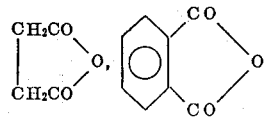

(9) Inorganic acid anhydrides such as $SO_3$ in the presence of:
   (a) Inorganic esters, e.g., dimethyl sulfate;
   (b) Acid halides, e.g., $C_6H_5COCl$, phosgene;
(10) Carbonium compounds such as triphenylcarbonium hexachloroantimonate, triphenylcarbonium hexafluorophosphate, tropylium hexachloroantimonate;
(11) Diazonium compounds such as p-chlorophenyldiazonium hexafluorophosphate;
(12) Tertiary oxonium compounds such as triethyloxonium tetrafluoroborate prepared, for example, by reaction of boron trifluoride etherate with epichlorohydrin;
(13) $Li^+PF_6^-$.

Many of the catalysts produce tetramethylene oxide polymers having a variety of terminal groups.

A particularly important tetramethylene oxide polymer is polytetramethylene ether glycol, hereinafter referred to as PTMEG. Examples of preferred catalysts for the manufacture of PTMEG are fluosulfonic acid, perchloric acid, and phosphorous pentafluoride.

As used herein "contacting temperature" refers to average contacting temperature unless otherwise indicated. Preferred contacting temperatures are temperatures in the range between about 25° C. and about 50° C.

As used herein, the term "average contacting temperature" is defined as A in the expression $$A = \frac{\Sigma(t \times T)}{\Sigma t}$$

in which the summation symbol $\Sigma$ has its usual significance, small $t$ represents time and the capital $T$ represents temperature in degrees centigrade. To illustrate the use of this formula in determining the average contacting temperature of a particular production run, one can (1) Plot the temperature v. time curve for the particular process conditions;
(2) Break up the curve into increments; for example, a smooth curve for a four-hour contact time at elevated temperature can be broken up into ten-minute increments, whereas a more abruptly changing curve of a half-hour contact time at higher temperature might be broken up into one-minute increments; the length of the time used in calculating average contacting temperature starts with addition of catalyst and ends when the cooling threshold temperature is reached in step 2;
(3) Determine each average increment temperature by adding the temperature at the beginning and end of each increment and divide each sum by two;
(4) Add all the increment temperature average values and divide the sum total by the lapsed time. The result is A above, i.e., the average contacting temperature for the particular run.

The polymerization conditions determine, to a large extent, the molecular weight of the polymer. For example, the catalyst:THF molar ratio helps to determine the molecular weight of the polymer. If a smaller molecular weight product is desired, larger catalyst:THF ratios are required for a specific set of conditions. Hence, this invention is not restricted to use of particular catalyst ratios. Preferred ratios, however, are in the range .01 to .25 mole catalyst per mole of THF. At a given temperature the molecular weight at first increases rapidly to a maximum, and then gradually reverts to a lower, essentially constant value. Hence, shorter time leads to higher molecular weight at a given temperature and catalyst:THF ratio. The term "molecular weight" as used herein refers to number average values. It has been reported elsewhere that the polymerization of tetrahydrofuran proceeds smoothly at low temperature, e.g., 0° C.–5° C., and also that at temperatures below about 20° C. the rate of polymerization of tetrahydrofuran is too low to be of commercial utility.

When tetrahydrofuran is polymerized in accord with this invention, however, instead of continuing to decrease, the molecular weight suddenly increases when the active THF-catalyst-polymer mixture is cooled to the lower temperature. Longer time at the lower temperature now leads to higher molecular weights, until an essentially constant molecular weight is obtained. This usually occurs in a time period between one and two hours at the lower temperature. There is also an abrupt increase in yield of polymer when the active THF-catalyst-polymer mixture is cooled to a lower temperature in accord with this invention, particularly when the temperature is lowered to 25° C. and below, e.g. below about 15° C., or more preferably below about 10° C. The lower temperature is at least 5° C. below the contacting temperature and preferably at least 10° C. below the contacting temperature. Generally, the greater the drop in temperature, i.e. the greater the difference between the contacting temperature and the catalytic activity termination temperature, the greater the increase in yield, until about 0° C. is reached. While temperatures below 0° C. are useful, they generally provide no more increase in yield over that obtained when the reaction mixture is cooled to about 0° C. Moreover, the viscosity of most polymers becomes very high when cooled to below 0° C.

After the THF and catalyst are contacted at a contacting temperature above 20°, the resulting THF-catalyst-polymer mixing is preferably cooled to below 15° C., and more preferably to below 10° C., at which temperature the catalytic activity-terminating agent is admixed therewith and the temperature is preferably maintained below about 15° C. and more preferably at a temperature below about 10° C. until the catalytic activity is substantially terminated.

It will be illustrated in the numbered examples herein that the increase in yield is dramatic and immediate upon lowering the temperature, and that the largest part of the change in yield occurs in the first minutes after cooling. Adding ice water to the reaction mixture, i.e., the active THF-catalyst-polymer mixture, when the reaction mixture is at contacting temperature does not produce the unexpected advantages of this invention and is not in accordance with this invention.

It will also be illustrated in the numbered examples herein (see Example 7) that the lowering of temperature must take place within the specified time in order to achieve the increase in yield. Hence, if the reaction mixture is held at elevated temperatures, i.e., above 50° C., for periods of time greater than those specified, e.g. for two hours at 65° C. or for 30 minutes at 75° C., the cooling step is without significant effect with respect to providing an increase in yield over that obtained at the elevated temperature.

In embodiments utilizing contacting temperatures below 50° C., it is preferred that the time above threshold temperature be up to 150 minutes, followed by a time below threshold temperature up to 150 minutes before catalytic activity terminating agent is added.

There are many agents recognized by the prior art for termination of the catalytic activity in an active THF-polymer-catalyst mixture. The reaction by which the terminating agent deactivates the THF-catalyst-polymer mixture is not completely understood. However, it is extremely rapid and exothermic. Merely contacting the active mixture and a terminating agent leads to almost instantaneous termination of catalytic activity. While we do not want to be bound by any theories, the following theory, which is based on experimental evidence, may account for the variety of results which may be obtained when the catalytic activity of various active THF-polymer-catalyst mixtures is terminated by the admixing of water. The theory postulates the existence of a dissociated oxonium ion. It is theorized that this ion can form some bond with a tetrahydrofuran molecule which then ring-opens, and that the result is a longer oxonium ion. This longer oxonium ion reacts with another tetrahydrofuran molecule, ring opening occurs, and a still longer oxonium ion results, and so on. In this way it is theorized the oxonium ions are soon long, catalytically active polymer chains.

It is further theorized that polymerization activity of a catalytically active polymer chain, namely of an oxonium ion, which is thus theorized to be the "active" species of the catalytically active THF-catalyst-polymer mixture, is terminated when this dissociated oxonium ion reacts to form any nondissociated compound. For example, water is thought to react with and destroy the active oxonium ion by forming the nondissociated inert alcohol, and hence stops the continuing polymerization. Other materials, e.g. HCl, can react with the oxonium ion, and thereby produce a stable, nondissociated, nonpolymerizing species, i.e., one having a stable terminal chloro group, according to the theory. It is pointed out that destroying the active polymerizing species is the same as terminating the "catalytic" activity of that polymer chain and that destroying the catalytic activity of all the chains is the same as terminating the catalytic activity of the active THF-catalyst-polymer mixture.

Hence the theory suggests that the termination of catalytic activity may involve different chemical reactions than the mere destruction of the "catalyst," e.g., fluosulfonic acid, by its reaction with the deactivation reagent. But whatever the mechanism, contacting an adequate amount of an activity-terminating agent with the catalytically active THF-catalyst-polymer mixture generally leads to almost instantaneous termination of the catalytic activity. However, the activity-terminating agent is consumed by its reaction. If less than a stoichiometric amount, based on its reaction with the catalyst, is employed, the catalytic activity of the THF-catalyst-polymer mixture may not be completely terminated.

Use of insufficient activity-terminating agent may lead to the formation of polymer having end groups resulting from the reaction of the active species and a catalyst decomposition product. For example, it has been shown that the nature of the catalyst, and the nature of the catalyst decomposition products, influences the identity of the nondissociated compound formed when the catalytic activity of a THF-polymer-catalyst mixture is terminated in the presence of water, especially if water is not available for reaction in large amounts. It has been shown that when the "catalyst" reacts with water, various reactive decomposition products may be formed, such as organic acids or inorganic acids (e.g., from the decomposition of anhydrides or acyl halides) and hydrohalic acids (e.g., from the hydrolysis of certain halogen-containing compounds). It is further theorized that these decomposition products compete with the water for reaction with the postulated active oxonium ion to form inactive, nondissociated end groups other than the alcohol, e.g., —Cl, —OAc. Hence this theory may help explain the fact that end groups other than hydroxyl can be formed when the catalytic activity of an active THF-polymer-catalyst mixture is terminated in the presence of water.

When terminal hydroxy is desired, it is preferred that the catalytic activity be terminated by admixing the mixture with water in an amount which is in large excess over the stoichiometric amount required to terminate the catalytic activity of the mixture. For example, in a preferred embodiment for producing PTMEG, we terminate the catalytic activity of the mixture by quickly adding from 50 to 500 moles of cold water per mole of catalyst employed in the mixture in order to assure maximum number of hydroxy chain terminations and greater ease in keeping the temperature at the desired level.

The catalytic activity of the active mixture can also be terminated by an agent which is water free. For example, the catalytic activity of the active THF-catalyst-polymer mixture may be terminated by ammonia gas or an amine. In this case, a terminal amine group is formed, rather than a hydroxy group. Alcohols can also be employed to terminate the catalytic activity. In this case, ether linkages are formed. Use of glycols as catalytic activity-terminating agents leads to coupling and hydroxy terminal groups. For example, when water or 1,4-butanediol is used to terminate the catalytic activity of a THF-catalyst-polymer mixture such as a THF-fluosulfonic acid-polymer mixture, PTMEG is formed. Hence, the catalytic activity-terminating agents used to terminate catalytic activity of the active THF-catalyst-polymer mixtures in his invention are any of the agents well known for this purpose, for example, water, ammonia, amines, alcohol, glycols, and mixtures thereof, to name a few.

In addition to the reactions with activity-terminating agents and with decomposition products, the active THF-catalyst-polymer mixture may react with certain catalysts to form stable, nonpolymerizing structures, for example esters. Hence, these terminal groups so formed must be hydrolyzed whenever maximum yields of PTMEG are desired. It is emphasized that the termination of catalytic activity by addition of water is not the same as the hydrolysis of these more or less stable end groups.

A preferred embodiment of this invention comprises admixing a suitable catalyst and THF at a temperature between about 25° C. and 50° C., preferably about 35° C., and for a period of time less than four hours and maintaining the resulting active THF-polymer-catalyst mixture at a temperature below 50° C., preferably at about 35° C., then cooling the active THF-polymer-catalyst mixture to a temperature below about 20° C., more preferably below about 15° C., and maintaining the mixture at a temperature below about 20° C., more preferably below about 15° C., preferably for a period of time less than about four hours before termination of the catalytic activity, and then mixing the cooled active mixture with a catalytic activity-terminating agent, and maintaining the resulting mixture at a temperature below about 20° C., and more preferably below about 15° C., until the termination of the catalytic activity is substantially complete.

Another preferred embodiment of this invention is the process for the production of PTMEG comprising the following steps: (1) contacting THF and a polymerization catalyst at a contacting temperature above about 20° C., (2) cooling the mixture resulting from step 1 to a lower temperature which is below about 25° C., and at least about 5° C. below said contacting temperature, and (3) mixing the cooled mixture and a catalytic activity-terminating agent at a temperature below about 25° C. and at least 5° C. below said contacting temperature until the catalytic activity is substantially terminated.

A preferred process for producing PTMEG in accordance with this invention comprises the following steps: (1) contacting THF and a polymerization catalyst, e.g., fluosulfonic acid, at a temperature above about 20° C., thereby forming a catalytically active THF-catalyst-polymer mixture, (2) cooling the mixture resulting from step 1 to a temperature which is below about 15° C., and (3) mixing the cooled mixture with water, or alternatively with 1,4-butanediol or with a mixture of water and 1,4-butanediol, at a temperature which is below about 15° C. until the catalytic activity is substantially terminated. While this invention is applicable to processes for producing THF polymers having an average molecular weight between about 200 and 10,000, it is particularly beneficial in processes for producing polymers having average molecular weights below about 5000.

As used herein, the term "conversion" refers to the percent of tetrahydrofuran monomer which is not recovered from the process as such, and is determined from the following formula:

$$\text{Percent conversion} = \frac{\text{wgt. THF fed} - \text{wgt. THF recovered}}{\text{wgt. THF fed}} \times 100$$

As used herein the term "yield" refers to the weight percent of the THF charge which appears as recovered polymer, and is determined as follows:

$$\frac{\text{Wgt. polymer recovered}}{\text{Wgt. THF fed}} \times 100 = \text{yield}$$

The term "loss" represents the weight percent of the feed which is not recovered as monomer or polymer. In the examples which follow, extreme care was taken to avoid mechanical losses, and subsequent ether extraction of the water washes indicated that much of the "loss" results from the extraction of low-molecular weight polymer into the water wash. Hence, whenever the water wash procedures used in a number of THF polymerization runs are identical, the relative amount of "loss" gives a good indication of the relative amount of low-molecular weight water-soluble polymer produced by the different polymerization procedures. It will be noted that if appreciable water-soluble polymer is formed, an appreciable quantity of the converted material is lost during the washing of the crude product, and hence conversion may be high, yet the yield may be low. Hence, the phenomenon of achieving normal conversion accompanied by low yield is a particularly acute problem in processes for production of low-molecular weight glycol polymers.

This invention is further illustrated but is not limited by the following examples in which, unless otherwise indicated, the quantities stated are in parts by weight, and the molecular weights are number average values calculated from the hydroxyl numbers of the polymer product on the basis of two hydroxyl groups per molecule of polymer.

Example 1

Three pairs of polymerization reactions were carried out using catalyst:THF ratios which were expected to provide polymer molecular weights of approximately 500, 1000 and 2500, respectively. In each of these polymerization runs 505 parts of freshly distilled anhydrous THF was used. Technical grade fluosulfonic acid (percent assay 97.5%; B and A code 1071) was used in the amount of 165.7, 89.4, and 38.0 parts in each of the 500, 1000, and 2500 molecular weight runs, respectively. The catalyst was added to the THF over a period of 8 to 10 minutes in every case, and in every case the maximum temperature was held to about 35° C. In all runs 4.0 hours lapsed from the time the catalyst was added until the catalytic activity was terminated by addition of water. One run of each molecular weight pair was a "control" procedure representing a prior art procedure. The other run of each molecular weight pair was performed in accordance with this invention and is labeled "chill and kill." In the case of the "control" run, the tetrahydrofuran-polymer-catalyst mixture was maintained at about 35° C. for the full four hours and then 1500 parts of room-temperature water were dumped into the reaction mixture with vigorous agitation. In the case of the "chill and kill" run the tetrahydrofuran-polymer-catalyst mixture was held at about 35° C. for three hours, and then the mixture was cooled to about 7° C. and held there until the catalyst activity was terminated by the similar addition of 1500 parts water at a time which was four hours from the start of polymerization reaction. All runs were then worked up by an identical procedure as follows: The deactivated reaction mass including the added water was heated to distill off the tetrahydrofuran and was subsequently steamed for one hour at 0.2 mm. Hg presure. In each run PTMEG 1500 parts of water was added and the steaming with stirring repeated. The series of steps consisting of water addition, one-hour steaming and phase separation is considered one "wash." A total of three such identical washes were used. After the final phase separation the separated polymer phase was finally dried by heating at 100° C. for one hour at 0.2 mm. Hg. pressure. In each run PTMEG was recovered and weighed.

The result of these polymerization runs is summarized in Table I, in which the terms "yield," "loss," and "molecular weight" are as defined above, the term 'Unreacted" signifies the weight percent of the THF charge which is recovered as monomer after the termination of catalytic activity, and the term "Percent difference" is the difference between the chill and kill and the control value, expressed as the weight percent of the control value.

TABLE I

| Expected Molecular Weight (M.W.) | Control Procedure | Chill and Kill Procedure | Percent Difference |
|---|---|---|---|
| 500 | M.W.=482 | 581 | |
|  | Yield=25.3 | 38.4 | +52 |
|  | Unreacted=37.2 | 29.1 | −22 |
|  | Loss=37.5 | 32.5 | −13 |
| 1,000 | M.W.=920 | 1,080 | |
|  | Yield=44.8 | 61.7 | +38 |
|  | Unreacted=34.6 | 25.5 | −26 |
|  | Loss=20.6 | 12.8 | −38 |
| 2,500 | M.W.=2,220 | 2,665 | |
|  | Yield=66.0 | 75.8 | +15 |
|  | Unreacted=29.0 | 19.4 | −33 |
|  | Loss=5.0 | 4.8 | −4 |

Example 2

Three polymerization runs were carried out over a four-hour period. In each of these runs 89.4 parts of fluosulfonic acid was added to 505 parts of room-temperature, freshly distilled, anhydrous THF over a period of about ten minutes. The reaction mixture of run X was allowed to reach 35° C. and was held at that temperature for four hours. Four hours after the addition of the catalyst 1500 parts of room-temperature water was dumped into this reaction mixture to terminate the catalytic activity. Four hours after the completion of the addition of catalyst to Run Y, Dry Ice, i.e., solid carbon dioxide, was dumped into this reaction mixture to drive the temperature down quickly. When the temperature reached 5.5° C. the catalytic activity was terminated by 1500 parts of ice-water mixture which was dumped into the reactor. Three hours after the addition of catalyst to run Z, the reaction mixture was cooled by external cooling to a temperature of 5° C. over a period of about ten minutes and held at that temperature until a time four hours after the addition of the catalyst. An ice-water mixture (1500 parts) was then dumped into the reactor to terminate catalytic activity. The crude product mixtures of these three runs were then worked up according to the workup procedure used in Example 1. The results are summarized in Table II, in which the terms "molecular weight" and "yield" are as defined above, and the term "percent difference" represents the difference between the yield obtained in that run and the yield obtained in run X expressed as a weight percent of the yield obtained in run X.

TABLE II

| | 35° | 5° | M.W. | Yield | Percent Difference |
|---|---|---|---|---|---|
| Run X | 4 hr | 0 | 920 | 44.8 | |
| Run Y | 4 hr | Moments | 934 | 49.4 | +10 |
| Run Z | 3 hr | 1 hr | 1,080 | 61.7 | +37 |

Example 3

Five sets of THF polymerizations consisting of 22 individual runs were made in a substantially identical manner, except that the times and temperatures differed. In each of the runs of this example, 505 parts of distilled anhydrous THF was polymerized by the addition of 89.4 parts of fluosulfonic acid catalyst. In each case the catalyst was added to the stirred THF over a period of about four minutes. For comparison purposes, one set of runs was made at 35° C.±2°, and a second set of runs was made at 6° C.±3°, and it is clear that neither of these two sets of runs were performed in accordance with this invention. In a third set of runs the polymerization temperature was held at 35° C.±2° for one hour and the temperature was then lowered by external cooling. In this set of runs, the lower temperature, i.e. 6° C.±3°, was held for one hour, two hours, and three hours, respectively, after the one-hour polymerization at approximately 35° C. and before the termination of the catalytic activity. In the fourth set of runs the 35° C. polymerization step was held for two hours, whereupon the temperature was lowered and a second 6° C. polymerization temperature was held for one-fourth, one-half, one, two and three hours, respectively, before catalytic activity was terminated. The fifth set was a single run in which the 35° C. temperature was held for three hours and the temperature lowered to 6° C. for one hour before catalytic activity was terminated.

The catalytic activity was terminated in each of the runs of this example by the addition of 750 parts of cracked ice-water mixture. The first set of runs was also cooled externally during the addition of the ice-water mixture to keep the temperature below 50° during the addition of the ice-water mixture. The remaining sets were maintained at a temperature below 15° C. during the addition of the ice-water mixture.

All the runs of this example were then worked up in an identical manner using a solvent recovery process which permitted rapid purification and recovery of the polymer. The workup procedure was as follows: The entire mass including the added water was heated to distill off unreacted THF, which was recovered and measured. Live steam was then introduced into the mixture. After one hour of steaming, the entire contents were cooled to below 84° C. and 866 parts of toluene was added and vigorously stirred therewith for about five minutes. After stirring ceased, two phases formed immediately, and the upper toluene layer was isolated. The amount of acidity in the toluene layer was determined, and calcium hydroxide was added to the toluene layer to neutralize the acidity and to provide a 10% excess of calcium hydroxide. The toluene phase was then subjected to azeotropic distillation to remove water. The substantially dry toluene-polymer solution was then filtered to remove suspended solids. Volatiles were removed from the filtrate under reduced pressure, and the weight of the dry, volatile-free, PTMEG residue was determined. The average molecular weight of each polymer was then determined by means of the hydroxyl number. The PTMEG yield, as defined above, which was achieved in several of these runs is plotted against the time of the polymerization in the figure. Curve A in the figure represents the results obtained in the 35° C.±2° series of runs. These are runs numbered 1 through 8 in Table III. Curve B in the figure represents the results obtained in the series of polymerizations carried out at 6° C.±3°. These are runs numbered 9 through 14 in Table III. Curve C in the figure represents four of the runs which were performed in accordance with this invention. These polymerizations were carried out for two hours at 35° C.±2° and then cooled to and held at 6° C.±3° for one-quarter, one-half, one, and two hours, respectively, before termination of catalytic activity. The runs on which curve C is based are runs 18 through 21 in Table III. The time indicated on the figure represents the time lapse (hours) from the end of the addition of catalyst to the beginning of deactivation of catalytic activity. Under the test conditions employed, about ten minutes was required to drop the temperature of the THF-catalyst-polymer mixture from about 35° C. to about 6° C., and this time period is included in the time lapse data herein. Hence, the first run used to prepare curve C, which utilized two hours at about 35° followed by one-quarter hour at the lower temperature, actually represents less than five minutes at about 6° C. The data are summarized in Table III, in which the headings are as defined hereinbefore.

TABLE III

| Run No. | Time (hrs.) At 35° | At 6° | Percent yield | Percent unreacted | Percent loss | Molecular weight |
|---|---|---|---|---|---|---|
| 1 | ¼ | 0 | 54.6 | 44.0 | 1.4 | 1,868 |
| 2 | ½ | 0 | 57.2 | 42.2 | 0.6 | 1,463 |
| 3 | 1 | 0 | 59.9 | 38.3 | 1.8 | 1,067 |
| 4 | 2 | 0 | 58.6 | 37.6 | 3.8 | 735 |
| 5 | 3 | 0 | 60.2 | 34.8 | 5.0 | 707 |
| 6 | 4 | 0 | 59.5 | 34.0 | 6.5 | 644 |
| 7 | 8 | 0 | 54.8 | 37.4 | 7.8 | 602 |
| 8 | 20 | 0 | 53.9 | 37.1 | 9.0 | 602 |
| 9 | 0 | 1 | 59.3 | 34.8 | 5.9 | 4,954 |
| 10 | 0 | 2 | 60.6 | 33.3 | 6.1 | 4,342 |
| 11 | 0 | 3 | 64.2 | 32.2 | 3.6 | 3,320 |
| 12 | 0 | 4 | 67.2 | 30.1 | 2.7 | 2,635 |
| 13 | 0 | 8 | 67.6 | 29.0 | 3.4 | 1,974 |
| 14 | 0 | 20 | 70.2 | 27.3 | 2.5 | 1,078 |
| 15 | 1 | 1 | 66.4 | 26.6 | 7.0 | 1,151 |
| 16 | 1 | 2 | 71.0 | 25.4 | 3.6 | 1,215 |
| 17 | 1 | 3 | 74.1 | 23.0 | 2.9 | 1,179 |
| 18 | 2 | ¼ | 67.6 | 28.2 | 4.2 | 854 |
| 19 | 2 | ½ | 69.9 | 26.2 | 3.9 | 923 |
| 20 | 2 | 1 | 72.6 | 23.9 | 3.5 | 869 |
| 21 | 2 | 2 | 73.6 | 23.8 | 2.6 | 923 |
| 22 | 3 | 1 | 71.0 | 24.6 | 4.4 | 821 |

Example 4

Fluosulfonic acid (29.2 parts) was added to THF (505 parts) over a period of ten minutes. The reaction mixture began to warm up immediately upon the addition of the catalyst but was not permitted to exceed approximately 35° C. Four hours after the addition of the catalyst the reaction mixture was cooled to about 7° C. and held at that temperature for one hour, at which time 1000 parts of water were added. During the addition of the water, external cooling was applied to keep the temperature of the reaction mixture below 15° C. The product was worked up according to the workup procedure used in Example 1, and PTMEG having a molecular weight of about 3000 was recovered in 79% yield.

Example 5

Six polymerization runs were made using the same quantities of THF and catalyst that were used in Example 3. In each run the total polymerization time was four hours. The first run, the control, was held at 35° C.±2° for the entire four hours and the catalytic activity terminated without lowering the temperature. Hence this control run was not in accordance with this invention. In the remaining five runs the temperature was held at 35° C.±2° for three hours, and then lowered rapidly to about 20° C., 15° C., 5° C., −15° C., −35° C., respectively, and held there until the catalytic activity was terminated. The catalytic activity was terminated in each of the runs of this example by the rapid addition of 750 parts of cracked ice-water mixture. All the runs of this example were then worked up to determine percent yield of polymer, percent recovered THF, percent THF loss, and molecular weight of the polymer product by the procedures of Example 3. These data are tabulated in Table IV.

TABLE IV

[3 hours at 35° C. and 1 hour at T]

|  | Control | | | | | |
|---|---|---|---|---|---|---|
|  | T= | | | | | |
|  | 35° C. | 20° C. | 15° C. | 5° C. | −15° C. | −35° C. |
| M.W. | 644 | 729 | 762 | 821 | 779 | 773 |
| Percent yield THF | 59.5 | 64.6 | 66.5 | 71.0 | 72.6 | 71.5 |
| Percent rec. THF | 34.0 | 29.9 | 24.1 | 24.6 | 22.4 | 24.4 |
| Percent lost THF | 6.5 | 5.5 | 9.4 | 4.4 | 5.0 | 4.1 |

Example 6

Fluosulfonic acid (82.2 parts by weight) was added to THF (1010 parts by weight), maintaining the maximum temperature at 35° C.±1°, and the resulting mixture was held at 35° C.±1° for a period of three hours. The temperature of the reaction mixture was then quickly dropped to 6° C.±3° and held at that temperature until a time four hours after the addition of the catalyst. Four hundred parts by weight of methanol which had been previously cooled to about 5° C. was then dumped with agitation into the cooled active THF-catalyst-polymer mixture. The temperature quickly rose to about 14° C. Stirring was continued for about twenty minutes. The resulting mixture was then steamed and 807.4 parts by weight of polymer was recovered using the solvent recovery process outlined in Example 3 herein. The molecular weight of the polymer as determined by osmometer measurements was 1704. On the basis of functional group analysis, the product was estimated to contain about 83 mole percent polytetramethylene ether glycol monomethyl ether and about 17 mole percent PTMEG.

Example 1 demonstrates the surprising increase in yield resulting from the process of this invention. It is noted that the relative improvement of yield is greater in runs in which lower molecular weight products are desired. From Example 2 it is clear that the unexpected increase in yield resulting from cooling the reaction mixture is an extremely rapid one and that a large increase in yield occurs within moments of the time that the reaction mixture is cooled in accordance with this invention. This is also clear from curve C of the figure. Runs 15 through 22 of Example 3 represents embodiments of this invention. It is clear from these data that the unexpected increase in yield resulting from this invention is dramatic with respect to both speed and magnitude. A comparison of runs 4 and 18, for example, shows the abrupt increase in polymer. This abrupt increase is totally unexpected in view of the rate of change in amount of polymer during either the 6° run or the 35° run as illustrated by the figure. It is emphasized that within experimental error all the runs of Example 3 had identically the same amount of catalyst and had identical recovery treatment. A comparison of runs 18 and 13 shows that two hours at 35° C. followed by ¼ hour during which the temperature was lowered to about 6° C. gave as high a yield as was reached in eight hours by the 6° run and moreover provided the lower molecular weight of 854, indicating increased utilization of catalyst. A comparison of runs 12 and 21 of Example 3 shows molecular weight of 2635 vs. 923, respectively, for a four-hour run at 6° C. vs. a two-hour run at 35° C., followed by two hours at 6° C. The lower molecular weight indicates much greater catalyst utilization. The 6° run (run 12) provided a 67.2% yield as compared to the 74.1% yield (run 17), 73.6% yield (run 21), and 71% yield (run 22) achieved in the same period in accordance with this invention. A comparison of runs 17, 14 and 8 shows that in four hours a better yield is achieved in accordance with this invention than that achieved in the 6° run (run 14) in twenty hours or in the 35° run (run 8) in twenty hours.

Example 5 shows that greater benefit is obtained in accordance with this invention by cooling the active THF-catalyst-polymer mixture to lower temperatures before termination of the catalytic activity up to a lower temperature of about 0° C. Though a lower temperature below 0° C. gives the improved yields of this invention, there is no additional yield gain resulting from the use of a temperature below about zero.

Example 7

Nineteen individual runs were made in a substantially identical manner except that the times and temperatures were varied. In each of the runs of this example 505 parts of distilled anhydrous THF was polymerized by the addition of 17.3 parts of technical grade fluosulfonic acid catalyst. In each case the catalyst was added to the stirred THF over a period of about 15 seconds.

The individual runs of this example were held for the period of time indicated in Table V at 65°±2° C., and then cooled and held for the period indicated in Table V at 25°±2° C. At this time catalytic activity was terminated.

It is noted that some of the runs utilized *no* time at 65° C.±2° C. and others utilized no time at 25° C.±2° C. In these runs the catalytic activity was terminated at the temperature employed. These runs, of course, were not in accordance with this invention. In each of the runs catalytic activity was terminated by addition of 750 parts of cracked ice-water mixture. All the runs of this example were then worked up in an identical manner (utilizing the solvent recovery procedure and the workup procedures set forth in Example 3, herein) to determine molecular weight and PTMEG yield. The pertinent data of this example is tabulated in Table V.

TABLE V

| | Time in hours | | N.W. | Percent yield |
|---|---|---|---|---|
| | At 65° C. ±2° | At 25° C. ± 2° | | |
| 7-1 | 0 | 1 | 3,994 | 24.1 |
| 7-2 | 0 | 2 | 6,172 | 54.7 |
| 7-3 | 0 | 3 | 6,010 | 67.3 |
| 7-4 | 0 | 4 | 4,661 | 70.6 |
| 7-5 | ¼ | 0 | 2,382 | 26.0 |
| 7-6 [1] | ¼ | 1 | 4,467 | 60.0 |
| 7-7 [1] | ¼ | 2 | 3,820 | 70.2 |
| 7-8 | ½ | 0 | 2,394 | 33.4 |
| 7-9 [1] | ½ | 1 | 2,987 | 59.1 |
| 7-10 [1] | ½ | 2 | 2,970 | 67.5 |
| 7-11 | 1 | 0 | 2,065 | 39.5 |
| 7-12 [1] | 1 | 1 | 1,973 | 43.2 |
| 7-13 [1] | 1 | 2 | 2,212 | 54.1 |
| 7-14 [1] | 1 | 3 | 2,762 | 60.8 |
| 7-15 | 2 | 0 | 1,860 | 38.5 |
| 7-16 | 2 | 1 | 1,713 | 36.5 |
| 7-17 | 2 | 2 | 1,794 | 40.5 |
| 7-18 | 3 | 0 | 1,707 | 39.7 |
| 7-19 | 3 | 1 | 1,740 | 38.0 |

[1] In accordance with this invention.

The data of Example 7 further illustrates this invention. Comparison of runs 7-1 and 7-6 shows that by preceding a one-hour contacting at 25° by a quarter-hour period at 65° C., the yield is improved from 24.1% to 60.0%. Note, however, that this is accompanied by slightly higher molecular weight which might be attributed to the slightly longer overall reaction time. Two hours at 25° C.±2° C. gave only 54.7% yield of 6172 molecular weight PTMEG (see run 7-2).

When contacting at temperatures above 50° C., maximum benefit of this invention is obtained by utilizing only a fraction (i.e., up to one-third) of the permissible contact time at the contacting temperature, and by utilizing up to two hours at a temperature below the threshold temperature. Hence, to compare runs in which a one-hour run at 25° is preceded by one-quarter, one-half, and one hour at 65° C., compare runs 7-6, 7-9, and 7-12. Yields are 60%, 59.1% and 43.2%, respectively, indicating that the useful catalytic activity of the mixture diminishes rapidly at some time after one-half hour at 65° C.

As defined herein, the cooling to below the threshold temperature must take place in less than 90 minutes for an average contacting temperature of 65° C. in order to be in accordance with this invention. Hence, in run 7-16, in which a one-hour contact at 25° C. is preceded by two hours at 65° C., the yield is only 36.5%. This is no improvement over the yield obtained at two hours at 65° C. (see run 7-15) or three hours at 25° C. (see run 7-3). Hence, run 7-16 is not in accordance with this invention, since the contacting step extends beyond the time limitation for 65° C.

A comparison of run 7-12 with 7-2; 7-13 with 7-3; 7-14 with 7-4 will illustrate that for the same total time lapse, the yield is lower in the runs performed in accordance with this invention under these specified conditions. However, the increased efficiency in terms of greater catalyst utilization is still definitely achieved in these runs in accordance with this invention, i.e., M.W. 1973 v. 6172 for two-hour run: 2212 v. 6010 for a three-hour run, and 2762 v. 4661 for a four-hour run.

Hence, as indicated above, when contacting temperatures above 50° C. are utilized, practice of this invention leads to both increase in catalyst efficiency and increase in yield (compared to the same time period at the lower temperature) only if the contacting time above the threshold temperature is up to one-third of the maximum defined permissible contact time, and the time below the threshold temperature is up to two hours. Embodiments of this invention utilizing more than these times generally show less yield than normally achieved at the lower temperature, but far greater yield than that normally achieved at the higher contacting temperature and moreover show greater catalyst efficiency than that achieved at the lower temperatures.

Example 8

Three runs were made which were identical to the runs of Example 7, except for contacting times and temperatures. The first run used a three-hour contact time at 50° C.±2° C., at which temperature the catalytic activity was terminated. The second run utilized one hour at 50° C.±2° C. followed by two hours at 30° C.±2° C., at which temperature catalytic activity was terminated. Hence, the first and second run each required about three hours for completion. In the first run 52.1% yield was achieved, whereas 66.7% yield was achieved in the second run. This second run, which is in accordance with this invention, provided product having M.W. of 4799. In the third run utilizing four hours at 30° C., product produced had 6371 M.W. This indicates that far greater catalyst utilization was achieved in the second run in accordance with this invention than in the third run which is not in accordance with this invention. The yield was approximately the same in the second run as that achieved in the third run, and much higher in the second run than in the first run.

Dumping the catalytically active mixture at a temperature above threshold temperature into an ice-water mixture to terminate catalytic activity does not produce the unexpected advantages of this invention and is not in accordance with this invention.

We claim:
1. A process for polymerizing tetrahydrofuran which includes the steps:
   (1) contacting tetrahydrofuran and a tetrahydrofuran polymerization catalyst selected from the group consisting of:
      ($ClSO_3H$); ($FSO_3H$); ($HClO_4$); and ($PF_5$);
      said contacting taking place at an average contacting temperature between 20° and 80° C., thereby forming a catalytically active mixture;
   (2) cooling the mixture to below the cooling threshold temperature, said cooling threshold temperature being defined as 5° C. below maximum contacting temperature when the maximum is up to 37° C., and said threshold temperature is defined as 32° C. when the maximum contacting temperature is above 37° C.;
   (3) maintaining the mixture resulting from step 2 at a temperature below the threshold temperature for a period of time up to four hours;
   (4) admixing the mixture resulting from step 3 with a catalytic activity terminating agent in more than a stoichiometric amount based on its reaction with the catalyst, said terminating agent being selected from the group water, 1,4-butanediol, and methanol; and
   (5) maintaining the temperature of the mixture resulting from step 4 below the threshold temperature until that catalytic activity is terminated.

the time interval from the contacting of step 1, to the reaching of the threshold temperature in step 2, being up to 240 minutes when the average contacting temperature is up to 50° C., and for an average contacting temperature between 50° C. and 80° C. is a time up to the time corresponding to that temperature on a smooth plot of temperature v. time which goes through the points:

| Degrees C.: | Minutes |
|---|---|
| 50 | 240 |
| 55 | 200 |
| 60 | 150 |
| 65 | 90 |
| 70 | 45 |
| 75 | 10 |
| 80 | 1 |

2. A process for polymerization of tetrahydrofuran which includes the steps:
   (1) contacting tetrahydrofuran and a catalyst selected from the group consisting of:
      ($ClSO_3H$); ($FSO_3H$); ($HClO_4$); and ($PF_5$);

at a contacting temperature between 25° and 50° C. for a period of time up to four hours, (2) cooling the catalytically active mixture resulting from step 1 to a temperature below 25° C. and at least 5° below said contacting temperature, maintaining the cooled mass at the lower temperature for a period of time less than four hours, (3) contacting the cooled mixture with a catalytic activity terminating agent at a temperature below 25° C. and at least 5° below said contacting temperature until the catalytic activity is terminated, said catalytic activity terminating agent being employed in at least a stoichiomeric amount based on its reaction with the catalyst said terminating agent being selected from the group water, 1,4-butanediol, and methanol.

3. A process for polymerizing tetrahydroufran which includes the following steps:

(1) contacting tetrahydrofuran and a catalyst selected from the group consisting of fluosulfonic acid, perchloric acid, and phosphorous pentafluoride at a temperature between 25° C. and 50° C. for a period of time up to four hours, (2) cooling the catalytically active mixture resulting from step 1 to a temperature below 20° C., and maintaining the cooled mixture at a temperature below 20° C. for a period of time less than four hours, and (3) mixing the cooled active mixture with a catalytic activity terminating agent and maintaining the resulting mixture at a temperature below 20° C. until the termination of the catalytic activity is complete, said catalytic activity terminating agent being employed in at least stoichiometric amount based on its reaction with the catalyst, said terminating agent being selected from the group water, 1,4-butanediol, and methanol.

4. A method as in claim 1 in which the catalytic activity terminating agent is water and the catalyst is fluosulfonic acid.

5. A method as in claim 1 in which the catalytic activity terminating agent is 1,4-butanediol and the catalyst is fluosulfonic acid.

6. In the polymerization of tetrahydrofuran by contacting tetrahydrofuran with a tetrahydrofuran polymerization catalyst selected from the group consisting of fluosulfonic acid, chlorosulfonic acid, perchloric acid, and phosphorous pentafluoride said contacting taking place at a temperature between 25° C. and 50° C., for a period of time up to four hours, said contacting resulting in a catalytically active mixture, the improvement comprising:

(1) cooling the catalytically active mixture to a temperature below 25° C. and at least 5° below the contacting temperature, (2) admixing a catalytic activity terminating agent with the cooled mixture and maintaining the temperature of the resulting mixture below 25° C. and at least 5° below said contacting temperature until termination of catalytic activity is complete, said catalytic activity terminating agent being employed in at least stoichiometric amount based on its reaction with the catalyst, said terminating agent being selected from the group water, 1,4-butanediol, and methanol.

7. A process for polymerizing tetrahydrofuran which includes the steps:

(1) contacting tetrahydrofuran with a tetrahydrofuran polymerization catalyst selected from the group consisting of fluosulfonic acid, perchloric acid and phosphorus pentafluoride at a contacting temperature in the range 25° to 50° C. for a period of time up to four hours, said catalyst and tetrahydrofuran being utilized in amounts to provide a molar ratio of catalyst to tetrahydrofuran in the range .01 to .25;

(2) cooling the mixture resulting from step 1 to below the cooling threshold temperature, said cooling threshold temperature being defined as 5° C. below maximum contacting temperature when the maximum is up to 37° C., and said threshold temperature is defined as 32° C. when the maximum contacting temperature is above 37° C.;

(3) maintaining the mixture resulting from step 2 at a temperature below the threshold temperature for a period of time up to four hours;

(4) admixing the mixture resulting from step 3 with a catalytic activity terminating agent in more than a stoichiometric amount based on its reaction with the catalyst, said terminating agent being selected from the group water, 1,4-butanediol, and methanol; and (5) maintaining the temperature of the mixture resulting from step 4 below the threshold temperature until that catalytic activity is terminated.

8. The method as in claim 7 in which the catalyst is fluosulfonic acid, the catalytic activity terminating agent is water, the time period at contacting temperature is up to 150 minutes, and the temperature of the mixture resulting from step 2 is maintained below threshold temperature for a period of time up to 150 minutes.

References Cited

UNITED STATES PATENTS

| | | |
|---|---|---|
| 2,751,419 | 6/1956 | Hill et al. |
| 2,856,370 | 10/1958 | Muetterties. |
| 3,254,056 | 5/1966 | Lovell. |
| 3,358,042 | 12/1967 | Dunlop et al. _____ 260—615 |

FOREIGN PATENTS 898,269   4/1945   France.

OTHER REFERENCES

PB 22713–S, Oct. 3, 1947, I. G. Farben, pp. 1–6.

LEON ZITVER, *Primary Examiner.*

HOWARD T. MARS, *Assistant Examiner.*

PO-1050
(5/69)

UNITED STATES PATENT OFFICE
CERTIFICATE OF CORRECTION

Patent No. 3,454,652              Dated July 8, 1969

Inventor(s) Andrew P. Dunlop and Edward Sherman

It is certified that error appears in the above-identified patent and that said Letters Patent are hereby corrected as shown below:

Column 8, line 34 reading "one hour at 0.2 mm. Hg pressure. In each run PTMEG" should read -- one hour. The water layer was then separated, and another --. Column 15, line 17 reading "tetrahydroufran" should read -- tetrahydrofuran --.

SIGNED AND
SEALED
JAN 27 1970

(SEAL)
Attest:

Edward M. Fletcher, Jr.
Attesting Officer

WILLIAM E. SCHUYLER, JR.
Commissioner of Patents